(12) United States Patent
Schenken et al.

(10) Patent No.: US 9,754,484 B2
(45) Date of Patent: *Sep. 5, 2017

(54) DETECTION OF TRAFFIC VIOLATIONS

(71) Applicant: UNITED PARCEL SERVICE OF AMERICA, INC., Atlanta, GA (US)

(72) Inventors: Christopher T. Schenken, Alpharetta, GA (US); Mark J. Davidson, Alpharetta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,639

(22) Filed: Mar. 26, 2015

(65) Prior Publication Data

US 2015/0199901 A1  Jul. 16, 2015

Related U.S. Application Data

(63) Continuation of application No. 13/473,068, filed on May 16, 2012, now Pat. No. 9,019,380.

(60) Provisional application No. 61/493,196, filed on Jun. 3, 2011.

(51) Int. Cl.
| | | |
|---|---|---|
| *G08G 1/01* | (2006.01) | |
| *G08G 1/017* | (2006.01) | |
| *H04N 7/18* | (2006.01) | |
| *G08G 1/04* | (2006.01) | |
| *G08G 1/042* | (2006.01) | |
| *G07C 5/08* | (2006.01) | |

(52) U.S. Cl.
CPC ............. *G08G 1/01* (2013.01); *G08G 1/0175* (2013.01); *H04N 7/183* (2013.01); *H04N 7/188* (2013.01); *G07C 5/0866* (2013.01); *G08G 1/04* (2013.01); *G08G 1/042* (2013.01)

(58) Field of Classification Search
CPC ...... G07C 5/0866; G08G 1/01; G08G 1/0175; G08G 1/04; G08G 1/042; H04N 7/183; H04N 7/188
USPC ......................................................... 348/149
See application file for complete search history.

(56) References Cited

U.S. PATENT DOCUMENTS

| | | |
|---|---|---|
| 4,559,518 A | 12/1985 | Latta, Jr. |
| 5,041,828 A | 8/1991 | Loeven |
| 5,281,948 A * | 1/1994 | Estrada ............... B60Q 1/50 340/433 |
| 5,281,949 A | 1/1994 | Durley et al. |

(Continued)

OTHER PUBLICATIONS

Diederichs et al, Experimental Evaluation of ITST based School Bus Stop Notifications for Car Drivers, 2011.*

(Continued)

*Primary Examiner* — Shan Elahi
(74) *Attorney, Agent, or Firm* — Alston & Bird LLP

(57) ABSTRACT

In general, embodiments of the present invention provide methods, apparatus, systems, computing devices, computing entities, and/or the like for detecting possible traffic violations of vehicles. For example, in one embodiment, this may include receiving an indication that a school bus has entered or is entering a stopped position. After receiving an indication that the school bus has entered or is entering the stopped position, an area proximate the school bus can be monitored to detect possible traffic violations.

27 Claims, 8 Drawing Sheets

(56) References Cited

U.S. PATENT DOCUMENTS

| | | | |
|---|---|---|---|
| 5,293,151 A * | 3/1994 | Rose | B60Q 1/50 116/28 R |
| 5,382,953 A * | 1/1995 | Hauptli | G08G 1/0175 340/433 |
| 5,570,127 A * | 10/1996 | Schmidt | B60R 1/00 340/433 |
| 6,008,741 A | 12/1999 | Shinagawa et al. | |
| 6,075,466 A | 6/2000 | Cohen et al. | |
| 6,188,329 B1 | 2/2001 | Glier et al. | |
| 6,281,808 B1 | 8/2001 | Glier et al. | |
| RE37,709 E * | 5/2002 | Dukek | 323/274 |
| 6,442,474 B1 | 8/2002 | Trajkovic et al. | |
| 6,546,119 B2 | 4/2003 | Ciolli et al. | |
| 6,556,903 B2 * | 4/2003 | Chinigo | B60R 21/01512 340/433 |
| 6,690,294 B1 | 2/2004 | Zierden | |
| 6,738,089 B1 * | 5/2004 | Silc | B60R 11/00 348/143 |
| 6,765,481 B2 * | 7/2004 | Haigh | G09F 21/04 116/28 R |
| 6,861,972 B2 | 3/2005 | Britton et al. | |
| 6,894,717 B2 | 5/2005 | Bakewell | |
| 6,970,102 B2 | 11/2005 | Ciolli | |
| 7,005,973 B2 * | 2/2006 | Haigh | G09F 21/04 116/28 R |
| 7,248,149 B2 | 7/2007 | Bachelder et al. | |
| 7,375,652 B2 | 5/2008 | Reeves et al. | |
| 7,382,244 B1 | 6/2008 | Donovan et al. | |
| 7,474,202 B2 * | 1/2009 | Rose | G08G 1/123 340/433 |
| 7,812,711 B2 * | 10/2010 | Brown | G08G 1/0175 340/426.18 |
| 8,599,260 B1 * | 12/2013 | Vaughn | G08G 1/04 348/149 |
| 9,019,380 B2 * | 4/2015 | Schenken | G08G 1/0175 348/148 |
| 2002/0054210 A1 | 5/2002 | Glier et al. | |
| 2002/0072847 A1 * | 6/2002 | Trajkovic | G08G 1/0175 701/117 |
| 2002/0118103 A1 * | 8/2002 | Tabe | B60Q 1/50 340/436 |
| 2002/0140577 A1 | 10/2002 | Kavner | |
| 2002/0186297 A1 | 12/2002 | Bakewell | |
| 2003/0061982 A1 * | 4/2003 | Phillips | B60Q 1/50 116/28 R |
| 2004/0054513 A1 * | 3/2004 | Laird | G07B 15/06 703/8 |
| 2004/0101166 A1 * | 5/2004 | Williams | G08G 1/054 382/104 |
| 2004/0263357 A1 * | 12/2004 | Hamilton | G08G 1/01 340/936 |
| 2005/0024257 A1 | 2/2005 | Britton et al. | |
| 2005/0259158 A1 * | 11/2005 | Jacob | H04N 3/1562 348/218.1 |
| 2005/0285721 A1 * | 12/2005 | Bucholz | B60R 25/305 340/426.1 |
| 2006/0095199 A1 | 5/2006 | Lagassey | |
| 2006/0269104 A1 * | 11/2006 | Ciolli | G08G 1/052 382/104 |
| 2007/0194950 A1 | 8/2007 | Boss et al. | |
| 2008/0048886 A1 * | 2/2008 | Brown | G08G 1/0175 340/937 |
| 2008/0157945 A1 * | 7/2008 | Bowler | B60Q 1/0023 340/433 |
| 2008/0180537 A1 * | 7/2008 | Weinberg | H04N 5/2256 348/211.99 |
| 2008/0218379 A1 | 9/2008 | Boss et al. | |
| 2009/0195651 A1 * | 8/2009 | Leonard | B60R 1/00 348/148 |
| 2009/0224942 A1 | 9/2009 | Goudy et al. | |
| 2009/0284394 A1 | 11/2009 | Boss et al. | |
| 2010/0020169 A1 | 1/2010 | Jang et al. | |
| 2010/0128127 A1 | 5/2010 | Ciolli | |
| 2010/0149334 A1 * | 6/2010 | Wirsz | G08G 1/0175 348/143 |
| 2010/0217480 A1 | 8/2010 | Link, II | |
| 2012/0177336 A1 * | 7/2012 | Bhan | H04N 5/77 386/224 |
| 2013/0215273 A1 * | 8/2013 | Kareev | H04N 7/183 348/149 |

OTHER PUBLICATIONS

Vijverberg, et al., High-Level Traffic-Violation Detection for Embedded Traffic Analysis, 2007.
European Patent Office, Extended European Search Report for Application No. 12169789.0, Oct. 28, 2014, 8 pages, European Patent Office, Germany.
United States Patent and Trademark Office, Office Action for U.S. Appl. No. 13/473,068, Aug. 8, 2014, 19 pages, U.S.A.
United States Patent and Trademark Office, Notice of Allowance for U.S. Appl. No. 13/473,068, Feb. 5, 2015, 27 pages, U.S.A.

* cited by examiner

DETECTION OF TRAFFIC VIOLATIONS

CROSS-REFERENCE TO RELATED APPLICATIONS

This application is a continuation of U.S. application Ser. No. 13/473,068 filed May 6, 2012, which claims the benefit of U.S. Provisional Application No. 61/493,196, filed Jun. 3, 2011, which is incorporated herein by reference in its entirety.

BACKGROUND

Various jurisdictions have imposed laws relating to the duty of a driver of a vehicle meeting or overtaking a school bus and reporting of such violations. For example, the state of Georgia has enacted Code Section 40-6-163 of the Official Code of Georgia. Currently, the methods of detecting violations and enforcing such laws are primarily manual. Thus, a need exists for more effective detection of violations of such laws.

BRIEF SUMMARY

In general, embodiments of the present invention provide methods, apparatus, systems, computing devices, computing entities, and/or the like for detecting possible traffic violations of vehicles.

In accordance with one aspect, a method for detecting possible traffic violations of vehicles is provided. In one embodiment, the method comprises receiving an indication that a school bus has entered or is entering a stopped position; and after receiving the indication that the school bus has entered or is entering the stopped position, monitoring an area proximate the school bus to detect possible traffic violations.

In accordance with another aspect, a computer program product for detecting possible traffic violations of vehicles is provided. The computer program product may comprise at least one computer-readable storage medium having computer-readable program code portions stored therein, the computer-readable program code portions comprising executable portions configured to receive an indication that a school bus has entered or is entering a stopped position; and after receiving the indication that the school bus has entered or is entering the stopped position, monitor an area proximate the school bus to detect possible traffic violations.

In accordance with yet another aspect, a system comprising at least one processor and at least one memory including computer program code is provided. In one embodiment, the at least one memory and the computer program code may be configured to, with the processor, cause the system to at least receive an indication that a school bus has entered or is entering a stopped position; and after receiving the indication that the school bus has entered or is entering the stopped position, monitor an area proximate the school bus to detect possible traffic violations.

BRIEF DESCRIPTION OF THE SEVERAL VIEWS OF THE DRAWING(S)

Reference will be made to the accompanying drawings, which are not necessarily drawn to scale, and wherein:

FIG. 1 is a diagram of a system that can be used to practice various embodiments of the present invention.

FIG. 2 includes a diagram of a data collection device that may be used in association with certain embodiments of the present invention.

DETAILED DESCRIPTION

Figure 1:
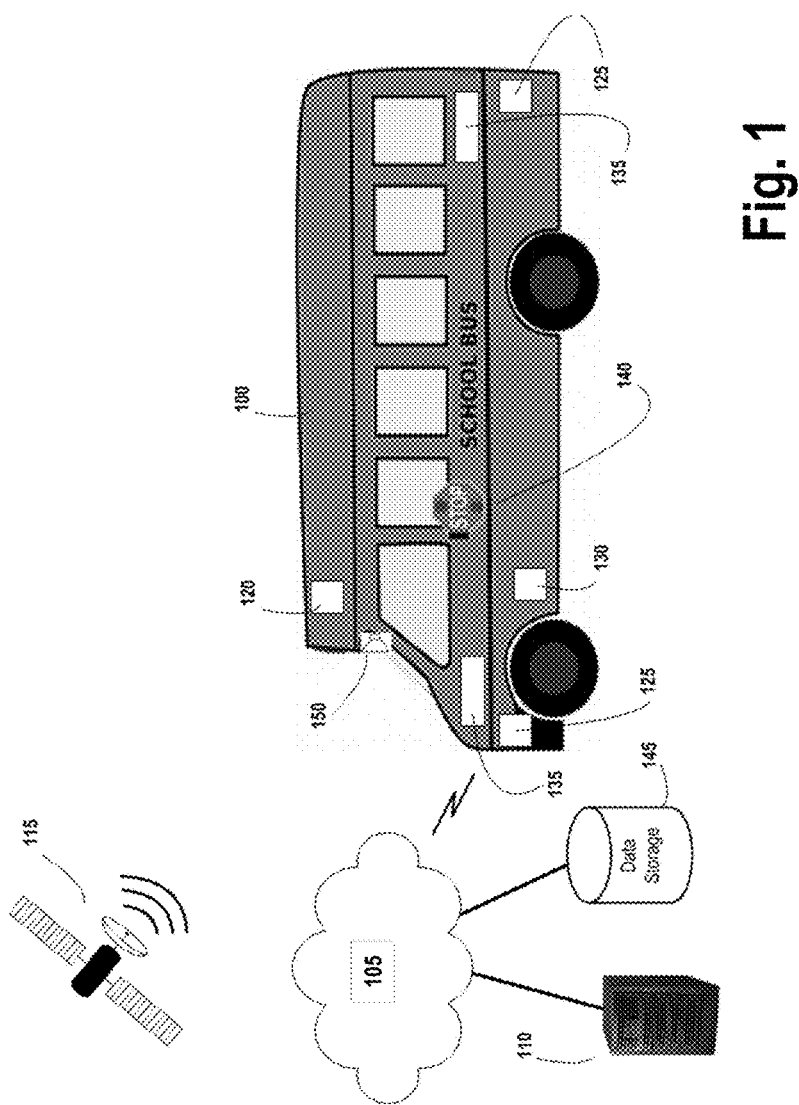

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media), with the sole exception being a transitory, propagating signal.

In one embodiment, a non-volatile computer-readable storage medium may include a floppy disk, flexible disk, hard disk, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory, multimedia memory cards (MMC), secure digital (SD) memory cards, Memory Sticks, and/or the like. Further, a non-volatile computer-readable storage medium may also include conductive-bridging random access memory (CBRAM), phase-change random access memory (PRAM), ferroelectric random-access memory (FeRAM), resistive random-access memory (RRAM), Silicon-Oxide-Nitride-Oxide-Silicon memory (SONOS), racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Rambus in-line memory module (RIMM), dual in-line memory module (DIMM), single in-line memory module (SIMM), video random access memory VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

II. Exemplary System Architecture

FIG. 1 provides an illustration of a system that can be used in conjunction with various embodiments of the present invention. As shown in FIG. 1, the system may include one or more vehicles 100, one or more servers 110, one or more Global Positioning System (GPS) satellites 115, one or more location sensors 120, one or more telematics sensors 125, one or more data collection devices 130, one or more networks 105, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Vehicle

In particular embodiments, vehicles 100 are primarily school buses. Although embodiments of the present invention are contemplated for use with other types of vehicles 100. For the sake of this disclosure, the term "school bus" is used to refer to any motorized vehicle. In various embodiments, the school bus 100 may include one or more location sensors 120, one or more vehicle (e.g., telematics) sensors 125, one or more data collection devices 130, one or more sensory indicators 150, and/or the like.

Further, in particular embodiments, the school bus 100 may also include one or more imaging devices 135. For example, the imaging devices 135 may be disposed on a particular side of the bus 100 (e.g., on the side of the bus 100 having the stop arm 140) and located at the front and rear of the bus 100. The front imaging device 135 may be facing towards the rear of the bus 100 and may be angled to capture vehicles passing the bus 100 on the particular side the imaging device 135 is mounted. The rear imaging device 135 may be facing towards the front of the bus 100 and may also be angled to allow for the proper capturing of images of vehicles passing the bus 100 on the particular side the imaging device 135 is mounted. In addition, the imaging device 135 may be mounted at a height with respect to the bus 100 to allow for the proper capturing of images of vehicles passing the bus 100.

In one embodiment, the imaging devices 135 may be analog or digital cameras (or video cameras or combinations thereof) for capturing images (e.g., image data). (It should be noted the terms "images," "image data," and similar terms are used herein interchangeably.) For example, the imaging devices 135 may be cameras with wide angle lenses and/or cameras with narrow angle lenses. In one embodiment, the imaging devices 135 may be dual-view imaging devices 135 that simultaneously record/capture images and/or video at different lines of sight. The imaging devices 135 may be configured to continuously record/capture images and/or video. Similarly, the imaging devices 135 may be configured to automatically record/capture and stop recording/capturing image data upon the occurrence of certain specified events, such as receiving an indication of a vehicle passing the bus 100 during a stop.

In one embodiment, the imaging devices 135 may include one or more processors, one or more temporary memory storage areas, and/or one or more permanent memory storage areas. For instance, the imaging devices 135 can capture (and timestamp) images (e.g., image data) and store them temporarily in a buffer or permanently in memory storage areas within or external to the imaging devices 135. In one embodiment, the imaging devices 135 may include, be associated with, or be in communication with a network interface for communicating with various entities. As indicated above, this communication may be via the same or different wired or wireless networks using a variety of wired or wireless transmission protocols. For example, using such protocols, the imaging devices 135 may communicate with (e.g., receive instructions from and transmit image data to) the server 110 and/or the data collection device 130.

Figure 2:
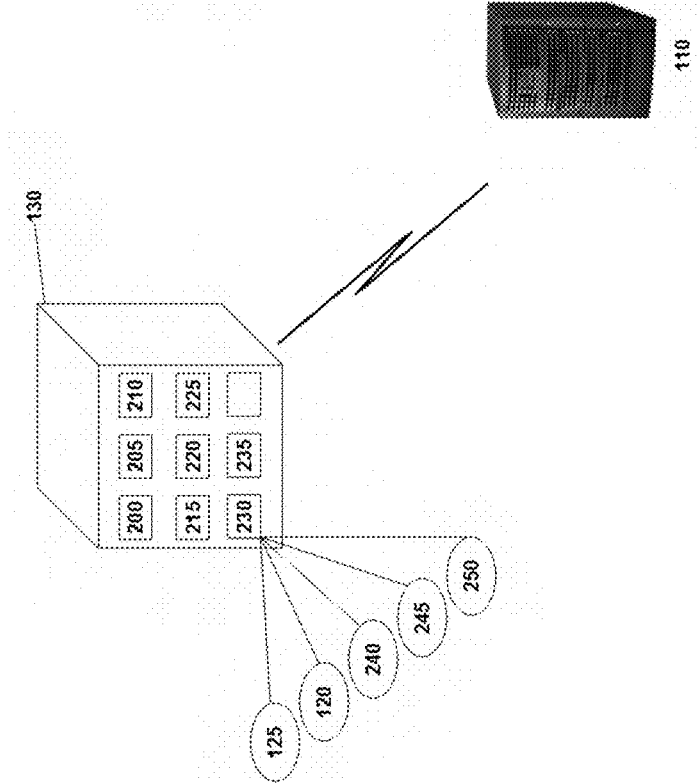

Reference is now made to FIG. 2, which provides a block diagram of an exemplary data collection device 130. In one embodiment, the data collection device 130 may include, be associated with, or be in communication with one or more power sources 220, one or more real-time clocks 215, one or more processors 200, one or more memory modules 210 (e.g., removable and/or non-removable memory, volatile and/or non-volatile memory, and transitory and/or non-transitory memory), one or more databases (not shown), one or more programmable logic controllers (PLC) 225, a J-Bus protocol architecture, and one or more electronic control modules (ECM) 245. For example, the ECM 245, which may be a scalable and subservient device to the data collection device 130, may have data processing capability to decode and store analog and digital inputs from vehicle systems, sensors, and imaging devices 135. The ECM 245 may further have data processing capability to collect and provide telematics data to the J-Bus (which may allow transmission to the data collection device 130), and output standard vehicle diagnostic codes when received from a vehicle's J-Bus-compatible on-board controllers 240 and/or sensors.

In various embodiments, the one or more processors 200 may be configured to execute one or more program modules (e.g., executable code). For instance, the one or more processors 200 may be configured to execute a violation detection module 500, a data collection module 600, and an image capture module 700. These modules may be stored on one or more of the memory modules 210 and may control certain aspects of the operation of the data collection device 130 and other components in communication with the data collection device 130, although their functionality need not be modularized.

In addition, in particular embodiments, the data collection device 130 may include, be associated with, or be in communication with one or more location-determining devices and/or one or more location sensors 120 (e.g., Global Navigation Satellite System (GNSS) sensors). The one or more location sensors 120 may be compatible with a Low Earth Orbit (LEO) satellite system or a Department of Defense (DOD) satellite system. Alternatively, triangulation may be used in connection with a device associated with a particular vehicle and/or the vehicle's driver and with various communication points (e.g., cellular towers or Wi-Fi access points) positioned at various locations throughout a geographic area to monitor the location of the bus 100 and/or its driver. The one or more location sensors 120 may be used to receive latitude, longitude, altitude, geocode, course, position, time, and/or speed data (e.g., referred to herein as telematics data). The one or more location sensors 120 may also communicate with the server 110, the data collection device 130, and/or a similar network entity.

Further, in particular embodiments, the data collection device 130 may include, be associated with, or be in communication with one or more vehicle sensors 125. In one embodiment, the vehicle sensors 125 may include vehicle sensors, such as engine, fuel, odometer, hubometer, tire pressure, location, weight, emissions, door, and speed sensors. Thus, the one or more vehicle sensors 125 may collect speed data, emissions data, RPM data, tire pressure data, oil pressure data, seat belt usage data, distance data, fuel data, and/or idle data (e.g., referred to herein as telematics data). The vehicle sensors 125 may also include environmental sensors, such as temperature sensors and/or the like for collecting such telematics data.

Finally, in particular embodiments, the data collection device 130 may include, be associated with, or be in communication with one or more communication ports 230 for receiving data from various sensors (e.g., via a CAN-bus) and/or imaging devices 135, one or more communication ports 205 for transmitting data, and one or more data radios 235 for communication with a variety of communication networks. Embodiments of the communication port 230 may include an Infrared Data Association (IrDA) communication port, a data radio, and/or a serial port. The communication port 230 may receive instructions for the data collection device 130. These instructions may be specific to the bus 100 in which the data collection device 130 is installed and may be specific to the geographical area in which the bus 100 is currently located. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. Via these communication standards and protocols, the data collection device 130 can communicate with various other entities, such as the server 110. As will be recognized, the data collection device 130 may transmit the telematics data and/or image data recorded/captured by the imaging devices 135 to the server 110 via one of several communication methods.

b. Exemplary Server

Figure 3:
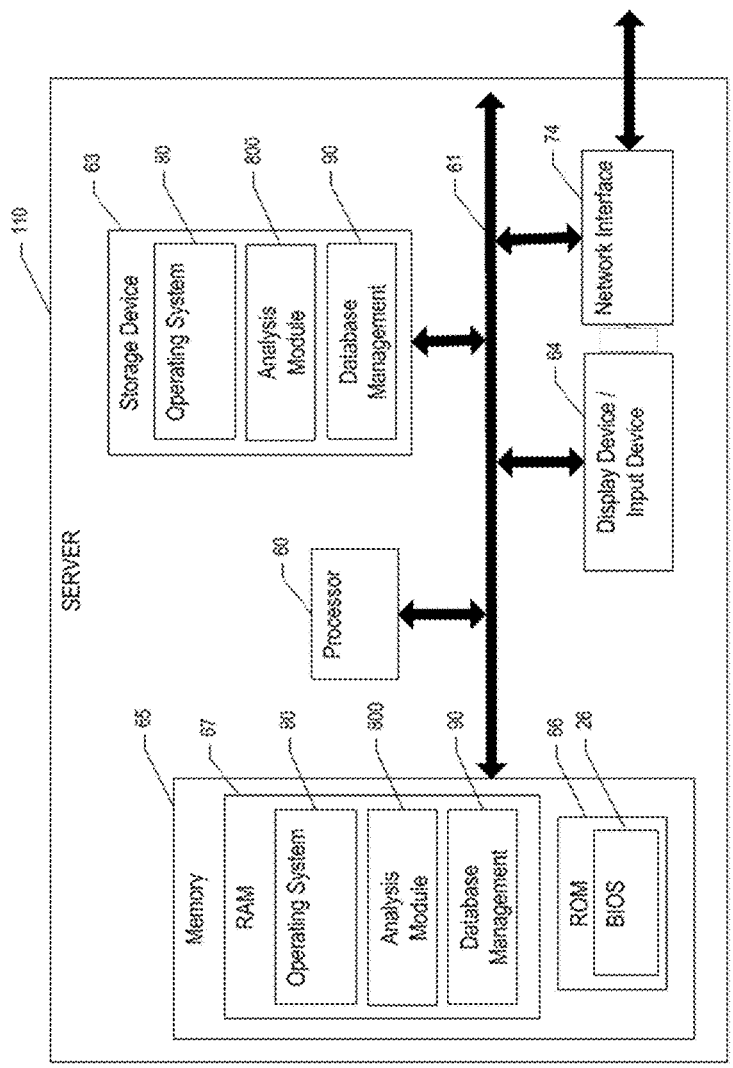
FIG. 3 is a schematic of a server in accordance with certain embodiments of the present invention.

FIG. 3 provides a schematic of a server 110 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the server 110 may include a processor 60 that communicates with other elements within the server 110 via a system interface or bus 61. As will be understood, the processor 60 may be embodied in a number of different ways. For example, the processor 60 may be embodied as one or more complex programmable logic devices (CPLDs), microprocessors, multi-core processors, coprocessing entities, application-specific instruction-set processors (ASIPs), and/or controllers. Further, the processor 60 may be embodied as one or more other processing devices or circuitry. The term circuitry may refer to an entirely hardware embodiment or a combination of hardware and computer program products. Thus, the processor 60 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 60 may be configured for a particular use or configured to execute instructions stored in volatile or non-volatile media or otherwise accessible to the processor 60. As such, whether configured by hardware or computer program products, or by a combination thereof, the processor 60 may be capable of performing steps or operations according to embodiments of the present invention when configured accordingly.

In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention when configured accordingly. A display device/input device 64 for receiving and displaying data may also be included in or associated with the server 110. The display device/input device 64 may be, for example, a keyboard or pointing device that is used in combination with a monitor. The server 110 may further include transitory and non-transitory memory, which may include both random access memory (RAM) 67 and read only memory (ROM) 65. The server's ROM 65 may be used to store a basic input/output system (BIOS) 26 containing the basic routines that help to transfer information to the different elements within the server 110.

In addition, in one embodiment, the server 110 may include at least one storage device 63, such as a hard disk drive, a CD drive, a DVD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 63 may be connected to the system bus 61 by an appropriate interface.

Furthermore, a number of program modules may be stored by the various storage devices 63 and/or within RAM 67. Such program modules may include an operating system 80, database management system 90, and an analysis module 800. As discussed in greater detail below, these modules may control certain aspects of the operation of the server 110 with the assistance of the processor 60 and operating system 80, although their functionality need not be modularized. In addition to the program modules, the server 110 may store and/or be in communication with one or more databases.

Also located within and/or associated with the server 110, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the server 110 may be configured to communicate via wireless external communication networks using any of a variety of protocols, such as 802.11, GPRS, UMTS, CDMA2000, WCDMA, TD-SCDMA, LTE, E-UTRAN, Wi-Fi, WiMAX, UWB, and/or any other wireless protocol.

It will be appreciated that one or more of the server's 110 components may be located remotely from other server 110 components. Furthermore, one or more of the components may be combined and additional components performing functions described herein may be included in the server 110.

III. Brief Overview of the Process

Figure 4:
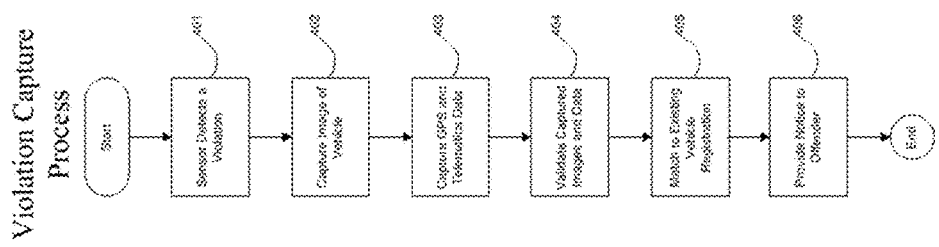
FIG. 4 is a flowchart illustrating operations and processes for detecting, capturing, and validating a traffic violation in accordance with various embodiments of the present invention.

FIG. 4 provides a flowchart of a process for detecting, capturing, and validating traffic violations according to one embodiment of the present invention. In this particular embodiment, the process may include the detection, capture, and validation of traffic violations involving the illegal passing of school buses 100 by vehicles during routine stops the bus 100 makes to pick up or drop off students. For example, a school bus 100 can make a stop to drop off students returning from school on its normal bus route, and the driver of the bus 100 can extend the stop arm 140 indicating to drivers of other vehicles behind or approaching the bus 100 to stop. If a driver of a vehicle fails to observe the stop arm 140 and drives around the stopped school bus 100, the violation can be detected, captured, and validated.

In one embodiment, the process begins with one or more sensors 125 on the school bus 100 being triggered and indicating that a possible traffic violation is occurring, shown as Step 401. For instance, in one embodiment, the one or more sensors may be laser devices mounted on the bus 100 that provide a "laser wall." In such an embodiment, the sensors can be triggered when a vehicle passes through the laser wall. However, other types of sensors may be used, such as motion sensors, sound sensors, magnetic sensors, and/or combinations thereof. Further, in particular embodiments, the indication of a possible traffic violation may be manually triggered, for instance, by bus drivers who notice vehicles passing illegally.

Additionally, in one embodiment, one or more sensors 125 may be configured to measure parameters of vehicles committing possible traffic violations, such as the distance of the vehicle to the school bus 100, the vehicle's speed, and/or the vehicle's direction of travel. Further, the triggering of a violation may cause a sensory indicator 150 to emit a perceivable indicator, such as sound or light. Such a sensory indicator may help to alert passengers and passersby that a possible violation is occurring and alert possible witnesses to observe details of the possible violation.

In Step 402, the imaging devices 135 mounted on the bus 100 can capture images (e.g., image data) of the front and rear of vehicles illegally passing the school bus 100. As mentioned above, the images may involve picture, video, or combination of both. In particular embodiments, the imaging devices 135 may be configured to constantly capture images into a revolving memory buffer. This memory buffer may be configured to replace the oldest images first with new images being captured by the imaging devices 135. Thus, in these particular embodiments, once a possible violation is detected, the system on the school bus can store the images of the vehicle involved in the possible violation in a more permanent memory along with additional supporting data. As a result of having the revolving memory buffer, for example, the system on the school bus 100 may not require as much memory.

In Step 403, the process can continue with capturing additional supporting data, which may include GPS and telematics data. For instance, the process may capture the date and time the possible violation occurred from the imaging devices 135 and/or one or more real-time clocks 215 that are components of the data collection device 130. In addition, the process may capture the location of the school bus derived from GPS data. Further, the process may capture other telematics-type analytics recorded/captured by the data collection device 130 that may assist in validating the violation that occurred, such as the status of the school bus's amber lights, red lights, stop arms, and/or brakes.

As described in further detail below, in various embodiments, the system on the school bus 100 may be configured to only collect data when the bus 100 is in "zones of interest," such as bus stops, railroad crossings, and school zones. The collection of such data in these zones of interest may help to facilitate the verification of traffic violations in addition to facilitating other review processes. For instance, the collection of such data at railroad crossings may be used to verify that railroad crossing compliance is being followed by the bus driver. Therefore, in particular embodiments, geofences can be defined that represent these zones of interest, and the system on the school bus 100 can detect when the bus 100 enters one of these zones of interest based on the defined geofences, for example.

Further, in particular embodiments, an area around the school bus 100 itself may be defined as a zone of interest or a "virtual bubble." In these particular embodiments, certain events that occur within this virtual bubble may trigger the recording/capturing of various data such as the detection of a student within the virtual bubble. In addition, the detection of certain events involving the bus 100 may trigger the recording/capturing of various data such as the door of the bus 100 opening, deceleration of the bus 100, and/or a stop arm 140 on the bus 100 being extended.

Once the detection that a possible violation has occurred and the proper images and supporting data have been collected, the images and supporting data may be validated to verify that a violation has actually occurred, shown as Step 404. In various embodiments, the captured images and supporting data can be gathered from memory and analyzed on a remote computing entity (e.g., server 110). For instance, in one particular embodiment, a portable device can be used to retrieve the captured images and supporting data from memory once the bus 100 has returned from its route. While in another embodiment, the bus 100 may include equipment that transmits the captured images and supporting data to the remote server 110.

In various embodiments, the validation process may include two steps. The first step may be an automatic process that uses pattern recognition software to capture certain information from the images, such as the license plate information from the vehicle and the make, model, and color of the vehicle. In addition, in particular embodiments, the automatic process may enhance the images with icons indicating the status of amber lights, red lights, stop arm position, and brakes of the school bus 100. In some embodiments, though, the enhancement may be manually performed.

The second step of the validation process may be a manual component of the process. For instance, in particular embodiments, a remote user may actually view the captured images to verify data from the images, such as whether students were present during the incident and/or the position of the stop arm 140. Further, the bus driver may be asked to review the images to verify/confirm that the images represent what he or she actually saw during the incident. Finally, other data may be collected that may assist law enforcement, such as the bus route, the stop at which the violation occurred, and the number of students onboard the bus at the time the violation occurred.

If the violation is verified or validated as having occurred, the process can continue with matching the validated data to existing vehicle registration information to identify the offender, shown as Step 405. For instance, in particular embodiments, the license plate information taken from the captured images can be used to query one or more data sources holding vehicle registration information such as a state's department of motor vehicles records.

Finally, in Step 406, the process can provide a complete notice to the offender of the violation. The complete notice may include such information as details of the violation (e.g., date, time, and location), the penalty amount for the violation, and the due date for payment of the penalty. Further, in particular embodiments, the notice may also include a URL to a website and/or a password. The offender may then use the URL and/or password to access the website and view further details of the violation, such as video showing occurrence of the violation and/or a Gantt chart indicating detailed timing of the status of events of interest associated with the violation. Additionally, the website may provide the offender with the option to pay the penalty amount via the website. Described in further detail below are various modules (e.g., computer program products) used by systems on the bus 100 and remotely to help facilitate the process for detecting, capturing, and validating traffic violations according to various embodiments of the present invention.

IV. Exemplary System Operation

Figure 5:
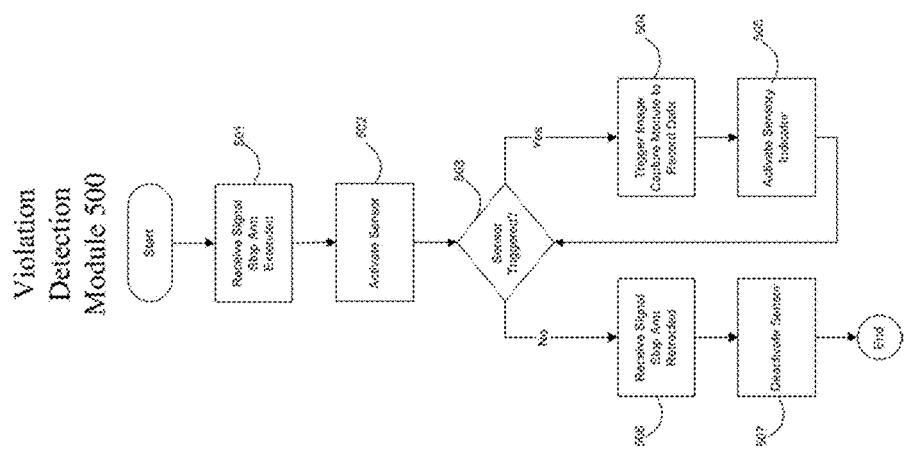
FIG. 5 is a flowchart illustrating operations and processes of a violation detection module in accordance with various embodiments of the present invention.
Figure 6:
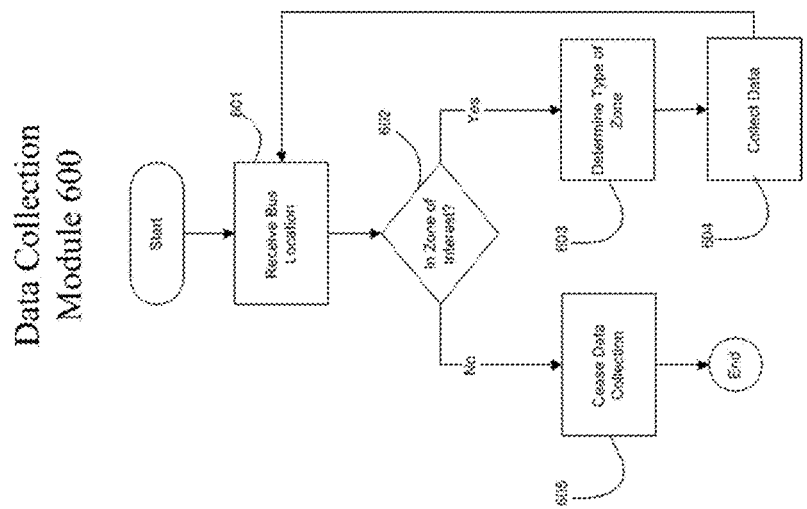
FIG. 6 is a flowchart illustrating operations and processes of a data collection module in accordance with various embodiments of the present invention.
Figure 7:
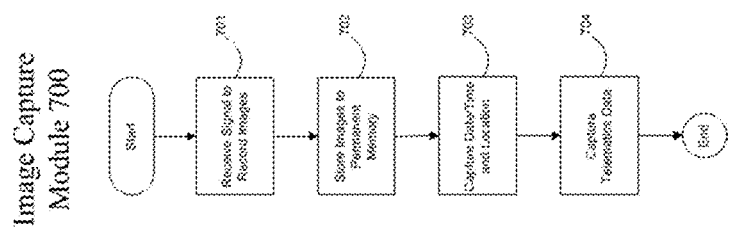
FIG. 7 is a flowchart illustrating operations and processes of an image capture module in accordance with various embodiments of the present invention.
Figure 8:
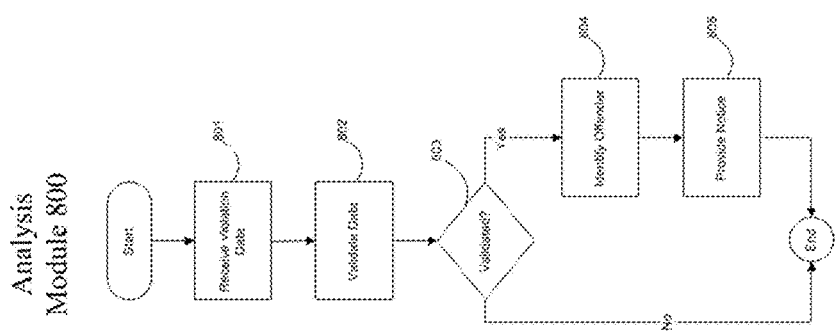
FIG. 8 is a flowchart illustrating operations and processes of an analysis module in accordance with various embodiments of the present invention.

Reference will now be made to FIGS. 5-8. FIG. 5 provides a flow diagram of a violation detection module 500 that is configured to monitor/detect when a traffic violation is occurring according to one embodiment. FIG. 6 provides a flow diagram of a data collection module 600 that is configured to collect certain data/parameters of vehicle operation according to one embodiment. FIG. 7 provides a flow diagram of an image capture module 700 configured to record/capture/store image data of a vehicle according to one embodiment. FIG. 8 provides a flow diagram of an analysis module 800 that is configured to conduct an analysis on the image data and collected data to verify a traffic violation has occurred according to one embodiment. These modules 500, 600, 700, 800 are described in greater detail below.

a. Violation Detection Module

In various embodiments, a data collection device 130 on a school bus 100 may include a violation detection module 500 configured to monitor/detect when a traffic violation is occurring. FIG. 5 illustrates a flow diagram of a violation detection module 500 according to various embodiments. This flow diagram may correspond to the steps carried out by one or more processors 200 of the data collection device 130 shown in FIG. 2 according to various embodiments.

In Step 501, according to one embodiment, the violation detection module 500 can receive a signal that a stop arm 140 of a school bus 100 has been extended. In other embodiments, the violation detection module 500 may be configured to receive signals indicating other events, such as deceleration of the bus 100 or opening of a door. Such a signal may be used to indicate that the school bus 100 is entering or has entered a stopped position and/or one or more passengers will embark or disembark the school bus 100. In response to such a signal, the violation detection module 500 can activate one or more sensors 125 configured to monitor and area proximate the school bus to detect possible traffic violations, shown as Step 502. For instance, in particular embodiments, the sensors 125 may be configured to detect when a vehicle proximate the school bus 100 is passing the bus 100 during a stop.

In Step 503, the violation detection module 500 can determine whether one or more of the sensors 125 have been triggered indicating that a possible violation is occurring. For instance, in one embodiment, the bus 100 may be equipped with one or more motion detectors that can send a signal to the violation detection module 500 if at least one of the detectors detects the motion of a vehicle moving past the bus 100 during a stop. If the violation detection module 500 determines a sensor has been triggered, the module 500 can trigger the image capture module 700 to record/capture the appropriate data for the possible violation, shown as Step 504. As is described in greater detail below, the image capture module 700 can be configured to record/capture image data of the possible violation along with supporting data so that the possible violation can be later verified or validated as having occurred.

Further, in particular embodiments, the violation detection module 500 can be configured to activate one or more sensory indicators 150 mounted on the bus 100, shown as Step 505. For example, the sensory indicators 150 may be of varying devices that provide sound and/or light. Thus, the sensory indicators 150 may provide an indication to passengers of the bus 100 or other vehicles or passersby that a possible violation is occurring. Such indications may help to alert possible witnesses to observe details of the possible violation. As a result, these witnesses may be able to provide more comprehensive statements on the occurrence of the possible violation and may be able to better assist law enforcement if needed. Once the violation detection module 500 has completed the step to properly record/capture the detected violation, the module 500 determines whether another triggering event of one or more of the sensors 125 occurs, shown as Step 503. Thus, the violation detection module 500 is configured in various embodiments to monitor/detect and capture multiple occurrences of traffic violations during a routine stop.

If the violation detection module 500 does not determine one or more of the sensors have been triggered or a subsequent triggering event of the sensors has occurred, the violation detection module 500 finally can receive a signal that the stop arms 140, for example, have been retracted (shown as Step 506). Again, depending on the embodiment, the violation detection module 500 may be configured to receive signals of other events such as, for example, a door closing on the bus 100 or the bus 100 beginning to move from a stopped position. At this point, the violation detection module 500 can deactivate the sensors 125, shown as Step 507. It should be noted that in particular embodiments, the violation detection module 500 may not be configured to activate and deactivate the one or more sensors 125. Instead, in these particular embodiments, the violation detection module 500 may be configured to monitor the activity of the sensors during the time the stop arm(s) 140 of the bus is extended.

b. Geofenced Areas

As previously discussed, in various embodiments, the data collection device 130 located on the school bus 100 may be configured to collect data during certain events. One of these events may be the school bus 100 entering into a zone of interest, such as a bus stop, a railroad crossing, or a school zone. In particular embodiments, a computing entity (e.g., the data collection device 130 and/or server 110) may be used to define geofences around zone of interests. Thus, the geofences may be defined to surround defined geographic areas of interest, such as areas surrounding bus stops, railroad crossings, school zones, and/or the like. In particular embodiments, a geofence may be defined, for example, by the latitude and longitude coordinates associated with various points along the perimeter of the particular area of interest (e.g., zone of interest). Alternatively, a geofence may be defined based on latitude and longitude coordinates of the center, as well as the radius, of the particular area of interest. A zone of interest, and therefore the geofence, may be any shape including, but not limited to, a circle, square, rectangle, an irregular shape, and/or the like. Moreover, geofenced areas need not be the same shape or size. Accordingly, any combination of shapes and sizes may be used in accordance with various embodiments of the present invention. Similarly, a geofence may overlap or reside wholly within another geofence.

In particular embodiments in which at least one geofence has been defined, the coordinates (or similar methods for defining the geofenced areas) may be stored in a database associated with, for example, the data collection device 130 and/or server 110. Thus, in various embodiments, as the vehicle 100 enters and exits the one or more defined geofences, a computing entity (the data collection device 130 and/or server 110) is configured to monitor the location of the vehicle 100 and collect certain telematics data as the school bus 100 operates within the geofenced area. Finally, it should be noted that the monitored and collected data may be different depending on the particular geofence. For instance, the computing entity may be configured to monitor a first set of telematics data if the geofence is associated with a bus stop and may be configured to monitor a second and different set of telematics data if the geofence is associated with a school zone.

c. Data Collection Module

In various embodiments, after the one or more geofenced areas (e.g., zones of interest) have been defined, the location of the school bus 100 may be monitored. For instance, the location of the school bus 100 may be monitored by any of a variety of computing entities, including the data collection device 130 and/or the server 110. For example, the bus's location at a particular time may be determined with the aid of location-determining devices, location sensors 120 (e.g., GNSS sensors), and/or other telemetry location services (e.g., cellular assisted GPS or real time location system or server technology using received signal strength indicators from a Wi-Fi network). By using the bus's location, an appropriate computing entity (e.g., data collection device 130) can determine when the bus 100 enters a defined zone of interest.

FIG. 6 illustrates a flow diagram of the data collection module 600 according to various embodiments. This flow diagram may correspond to the steps carried out by the one or more processors 200 of the data collection device 130 shown in FIG. 2 as the processors 200 execute the module 600 according to various embodiments.

In Step 601, the data collection module 600 can receive and/or determine the bus's location and determine whether the bus 100 has entered a zone of interest, shown as Step 602. In response to (e.g., after) a determination that the bus 100 has entered a zone of interest, the data collection module 600 can determine the type of zone the bus 100 has entered, shown as Step 603. As previously mentioned, in particular embodiments, the data collection module 600 may be configured to collect certain data depending on the type of zone of interest the bus has entered.

In one embodiment, once the data collection module 600 has determined the type of zone of interest, the data collection module 600 can identify, collect, and/or record/capture/store relevant telematics data, shown as Step 604. For example, the data collection module 600 can identify, collect, and/or record/capture/store a variety of telematics data associated with the bus 100, such as date and time data, location data, bearing data, brake pressure data, acceleration data, deceleration data, speed data, engine data, tire pressure data, idle data, meteorological data, and/or the like. After the bus 100 has entered the zone of interest, the data collection module 600 continues to monitor the location of the bus 100, shown as Step 601. Once the school bus 100 leaves the zone, the data collection module 600 can stop identifying, collecting, and/or recording/capturing/storing telematics data, shown as Step 605.

In another embodiment, the data collection module 600 identify, collect, and/or record/capture/store a variety of telematics data associated with the bus 100 in response to certain events, such as the door of the bus 100 opening, deceleration of the bus 100, and/or a stop arm 140 on the bus 100 being extended. For example, when a bus driver extends the stop arms of a school bus 100, this may trigger the data collection module 600 to begin identifying, collecting, and/or recording/capturing/storing a variety of telematics data. In still another embodiment, the data collection module 600 may continuously and/or periodically record such data.

Depending on the embodiment, the data collection module 600 may be configured to record/capture the collected data using various techniques. For instance, in one embodiment, the data collection module 600 may be configured to record/capture the data into a revolving memory buffer in which the newer recorded/captured data overwrites the oldest recorded/captured data. In such an embodiment, the recorded/captured data associated with a traffic violation may be moved to more permanent memory so that it may be later retrieved. In another embodiment, the data collection module 600 may be configured to simply record/capture all of the data to more permanent memory so that any and all of the data may be retrieved and/or reviewed. Finally, in various embodiments, the data collection device 130 may be configured to transmit the recorded/captured telematics data to a remote location (e.g., server 110) based on whether the data is associated with a possible traffic violation, for example. As a result of this process, additional data can be provided to supplement the images/image data recorded/captured during a possible traffic violation that may assist in verifying whether an actual traffic violation did in fact occur.

d. Image Capture Module

As previously discussed, in various embodiments, the one or more imaging devices 135 mounted on the school bus 100 may be configured to continuously record/capture image data (e.g., pictures and/or video) to a revolving memory buffer or may be configured to begin to record images to the buffer memory upon, for example, the stop arm 140 on the bus 100 being extended. Further, as previously described, in various embodiments, the image data may be retrieved from the buffer and stored on more permanent memory upon a determination that a possible traffic violation has occurred. Thus, the data collection device 130 on the school bus 100 may also include an image capture module 700 configured to capture the image data and supporting data (e.g., telematics data) associated with the possible traffic violation.

FIG. 7 illustrates a flow diagram of the image capture module 700 according to various embodiments. This flow diagram may correspond to the steps carried out by the one or more processors 200 of the data collection device 130 shown in FIG. 2 as the processors 200 execute the module 700 according to various embodiments.

In Step 701, the image capture module 700 receives a signal to record/capture (e.g., permanently store) image data from the revolving memory buffer. For instance, in one embodiment, the violation detection module 500 can send a message to the image capture module 700 to record/capture such image data (e.g., permanently store such image data). The image capture module 700 may retrieve the image data from the buffer in different ways according to various embodiments. For example, in one embodiment, the image capture module 700 can be configured to retrieve a certain portion of the image data from the buffer after receiving the signal. This portion of the image data may be equal to a certain amount of the buffer's memory or may be equal to a certain number of images placed in the buffer. Generally, the concept is to record/capture enough of the image data to capture the entire possible traffic violation. In another embodiment, the message received from the violation detection module 500 may include one or more timestamps that the image capture module 700 may use to select the appropriate image data from the buffer. In such an embodiment, the recorded/captured images by the imaging devices 135 may be saved to the buffer along with timestamps facilitate the selection of the proper image data.

In Step 702, the image capture module 700 can store the image data to more permanent memory. For instance, as previously discussed, the data collection device 130 may include, be associated with, or be in communication with memory modules 210 that include non-volatile memory. Thus, the image capture module 700 may store the image data in such memory. Further, in Step 703, the image capture module 700 can capture the date, time, and location of the bus 100 when the possible traffic violation occurs. Depending on the embodiment, the image capture module 700 may capture this information from the image data or from other devices, such as location sensors 120 and/or real-time clocks 215. In various embodiments, the image capture module 700 can also store this information in the more permanent memory along with the image data. Finally, in Step 704, the image capture module 700 can capture the appropriate telematics data and record/capture the data in the more permanent memory.

In various embodiments, the image data and supporting data (e.g., including telematics data) for the possible traffic violation stored in the more permanent memory can be later retrieved from the memory and stored in remote data storage 145. For instance, in one embodiment, a portable device can be used to retrieve the image data and supporting data from the memory once the bus 100 has returned from its route. In another embodiment, the data collection device 130 can be configured to transmit the data to a remote site. As described in greater detail below, the image data and supporting data can be validated and/or verified to confirm that a traffic violation did in fact occur and that the offender is identified based on the validated and/or verified data.

e. Analysis Module

As previously discussed, in various embodiments, the remote server 110 may include an analysis module 700 configured to validate and/or verify the captured image data and supporting data associated with a possible traffic violation to confirm that a traffic violation did in fact occur and that the offender is identified. FIG. 8 illustrates a flow diagram of the analysis module 800 according to one embodiment. This flow diagram may correspond to the steps carried out by the processors 60 of the server 110 shown in FIG. 3 as the processor 60 executes the module 800 according to various embodiments.

In Step 801, the analysis module 800 can receive the image data and supporting data for a particular traffic violation. For instance, in one embodiment, the analysis module 800 can retrieve data from remote data storage 145, for example. While in another embodiment, the analysis module 800 can retrieve the data locally stored on the server 110.

In Step 802, the analysis module 800 can validate and/or verify the data. According to various embodiments, the analysis module 800 can make use of pattern recognition software to collect information from the image data such as the number and state on the vehicle's license plate and the make, model, and color of the vehicle. Further, the analysis module 800 may collect information from the image data such as whether the stop arm 140 of the bus 100 was extended, whether the red lights of the bus 100 were on, and/or other information about the location of the stop such as a street name. In addition, in particular embodiments, the analysis module 800 may enhance the image data by adding icons to indicate the status of the amber lights, red lights, stop arm position, and/or brakes of the bus 100.

In particular embodiments, the image data and supporting data may also be validated and/or manually. For instance, in one embodiment, a remote user may actually view the images and verify the collected data from the images. In addition, the bus driver may be asked to view the images and verify that the images accurately represent what he or she saw during the incident. Further, additional data may be collected and/or added to the captured data, such as the bus route, the stop at which the violation occurred, and the number of students onboard the bus at the time the violation occurred.

Returning to FIG. 8, the analysis module 800 can confirm that the collected data has been validated (both automatically and manually in various embodiments), shown as Step 803. For instance, one or more fields may be set in the data that indicates whether the data has been validated and/or verified. If the analysis module 800 determines the data has not been validated and/or verified, the module 800 ends the process. This may involve the analysis module 800 displaying a message stating that the violation could not be verified. However, if the analysis module 800 determines the data has been validated and/or verified, the module 800 can identify the offender, shown as Step 804. For instance, in one embodiment, the analysis module 800 can use information from the collected data (such as license plate state and number, for example) and search one or more databases to identify the driver associated with the information (e.g., identify the driver to which the car displaying the plate is registered). For example, this step may involve the analysis module 800 querying a particular state's division of motor vehicle registration records to identify the driver/offender associated with the license plate. As a result, the offender can be identified for the traffic violation.

In Step 805, the analysis module 800 can provide a notice to the offender of the violation. In particular embodiments, this step may involve the analysis module 800 providing some type of document to the offender via email or mail that includes details of the violation, such as an image from the violation, the date and time of the violation, the place of the violation, the penalty amount, and the due date for payment of the penalty. Additionally, the document may also provide the offender with a URL to a website and/or a password the offender may use on the website to gain access to additional information about the violation and/or to provide a mechanism to allow the offender to pay the penalty. For example, such information provided through the website may include a video of the violation and a Gantt chart indicating detailed timing of the status of events of interest that occurred during the violation. As will be recognized, a variety of other approaches and techniques can used to adapt to various needs and circumstances.

V. Conclusion

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation. Finally, it should be noted that similar processes and techniques as described within this disclosure may be used to monitor/detect other types of traffic violations such as traffic violations relating to bike lanes, construction sites, fire truck move over, and police move over.

The invention claimed is:

1. A method for detecting possible traffic violations of vehicles, the method comprising:
    capturing telematics data, from one or more telematics devices, affixed to a school bus, comprising at least one sensor detecting a characteristic relating to the school bus itself, the telematics data indicating at least one detected geolocation of the school bus;
    receiving, via one or more processors, an indication that the school bus has entered or is entering a stopped position;
    after receiving the indication that the school bus has entered or is entering the stopped position, (a) automatically capturing image data, via an imaging device, and storing the image data in a temporary memory storage area and (b) monitoring, via the one or more processors, an area proximate the school bus to detect possible traffic violations;
    detecting, via the one or more processors, a possible traffic violation; and
    responsive to detecting the possible traffic violation, transferring the image data, comprising visible indicia indicating a vehicle is passing the school bus, in the stopped position, in the area proximate the school bus, from the temporary memory storage area to a permanent memory storage area.

2. The method of claim 1, wherein (a) the possible traffic violation is detected via one selected from the group consisting of a motion sensor, a sound sensor, or a magnetic sensor, and (b) the possible traffic violation is the vehicle passing the school bus in the area proximate the school bus.

3. The method of claim 1 further comprising, responsive to detecting the possible traffic violation, causing a perceivable indication to be emitted.

4. The method of claim 1, wherein the indication that the school bus has entered or is entering the stopped position is received in response to one selected from the group consisting of the school bus stopping, the school bus decelerating, a door on the school bus opening, or an arm on the school bus extending.

5. The method of claim 1 further comprising capturing telematics data after entering a predefined zone of interest.

6. The method of claim 1 further comprising validating the captured image data to confirm that an actual traffic violation occurred.

7. A system for detecting possible traffic violations of vehicles, the system comprising at least one processor and at least one memory including computer program code, the at least one memory and the computer program code configured to, with the processor, cause the system to at least:
    capture telematics data, from one or more telematics devices, affixed to a school bus, comprising at least one sensor detecting a characteristic relating to the school bus itself, the telematics data indicating at least one detected geolocation of the school bus;
receive an indication that the school bus has entered or is entering a stopped position;
after receiving the indication that the school bus has entered or is entering the stopped position, (a) automatically capture image data, via an imaging device, and storing the image data in a temporary memory storage area and (b) monitor an area proximate the school bus to detect possible traffic violations;
detect a possible traffic violation; and
responsive to detecting the possible traffic violation, transfer the image data, comprising visible indicia indicating a vehicle is passing the school bus, in the stopped position, in the area proximate the school bus, from the temporary memory storage area to a permanent memory storage area.

8. The system of claim 7, wherein (a) the possible traffic violation is detected via one selected from the group consisting of a motion sensor, a sound sensor, or a magnetic sensor, and (b) the possible traffic violation is the vehicle passing the school bus in the area proximate the school bus.

9. The system of claim 7, wherein the system is further configured to, responsive to detecting the possible traffic violation, cause a perceivable indication to be emitted.

10. The system of claim 7, wherein the indication that the school bus has entered or is entering the stopped position is received in response to one selected from the group consisting of the school bus stopping, the school bus decelerating, a door on the school bus opening, or an arm on the school bus extending.

11. The system of claim 7, wherein the system is further configured to capture telematics data after entering a predefined zone of interest.

12. The system of claim 7, wherein the system is further configured to validate the captured image data to confirm that an actual traffic violation occurred.

13. A computer program product for detecting possible traffic violations of vehicles, the computer program product comprising at least one non-transitory computer-readable storage medium having computer-readable program code portions stored therein, the computer-readable program code portions comprising:
an executable portion configured to capture telematics data, from one or more telematics devices, affixed to a school bus, comprising at least one sensor detecting a characteristic relating to the school bus itself, the telematics data indicating at least one detected geolocation of the school bus;
an executable portion configured to receive an indication that the school bus has entered or is entering a stopped position;
an executable portion configured to, after receiving the indication that the school bus has entered or is entering the stopped position, (a) automatically capture image data, via an imaging device, and storing the image data in a temporary memory storage area and (b) monitor an area proximate the school bus to detect possible traffic violations;
an executable portion configured to detect a possible traffic violation; and
an executable portion configured to, responsive to detecting the possible traffic violation, transfer the image data, comprising visible indicia indicating a vehicle is passing the school bus, in the stopped position, in the area proximate the school bus, from the temporary memory storage area to a permanent memory storage area.

14. The computer program product of claim 13, wherein (a) the possible traffic violation is detected via one selected from the group consisting of a motion sensor, a sound sensor, or a magnetic sensor, and (b) the possible traffic violation is the vehicle passing the school bus in the area proximate the school bus.

15. The computer program product of claim 13 further comprising an executable portion configured to, responsive to detecting the possible traffic violation, cause a perceivable indication to be emitted.

16. The computer program product of claim 13, wherein the indication that the school bus has entered or is entering the stopped position is received in response to one selected from the group consisting of the school bus stopping, the school bus decelerating, a door on the school bus opening, or an arm on the school bus extending.

17. The computer program product of claim 13 further comprising an executable portion configured to capture telematics data after entering a predefined zone of interest.

18. The computer program product of claim 13 further comprising an executable portion configured to validate the captured image data to confirm that an actual traffic violation occurred.

19. The method of claim 1, further comprising:
replacing an oldest image of the image data in the temporary memory with a new image, captured by one or more imaging devices, of at least one of a front and a rear of a vehicle illegally passing the school bus in response to detecting the traffic violation.

20. The system of claim 7, wherein the memory and the computer program code configured to, with the processor, further cause the system to:
replace an oldest image of the image data in the temporary memory with a new image, captured by one or more imaging devices, of at least one of a front and a rear of a vehicle illegally passing the school bus in response to detecting the traffic violation.

21. The computer program product of claim 13, further comprising:
an executable portion configured to replace an oldest image of the image data in the temporary memory with a new image, captured by one or more imaging devices, of at least one of a front and a rear of a vehicle illegally passing the school bus in response to detecting the traffic violation.

22. The method of claim 5, wherein:
the predefined zone of interest comprises at least one of a geographic area surrounding one or more bus stops, a geographic area surrounding one or more railroad crossings, a geographic area surrounding one or more school zones or an area surrounding the school bus itself.

23. The system of claim 11, wherein:
the predefined zone of interest comprises at least one of a geographic area surrounding one or more bus stops, a geographic area surrounding one or more railroad crossings, a geographic area surrounding one or more school zones or an area surrounding the school bus itself.

24. The computer program product of claim 17, wherein:
the predefined zone of interest comprises at least one of a geographic area surrounding one or more bus stops, a geographic area surrounding one or more railroad crossings, a geographic area surrounding one or more school zones or an area surrounding the school bus itself.

25. The method of claim 1, further comprising:
capturing an indication of a date, a time and a location of the school bus in an instance in which the possible traffic violation is detected.

26. The system of claim 7, wherein the system is further configured to:
capture an indication of a date, a time and a location of the school bus in an instance in which the possible traffic violation is detected.

27. The computer program product of claim 13, further comprising:
an executable portion configured to capture an indication of a date, a time and a location of the school bus in an instance in which the possible traffic violation is detected.

\* \* \* \* \*